United States Patent
Greven et al.

(10) Patent No.: US 11,180,216 B2
(45) Date of Patent: Nov. 23, 2021

(54) PEDELEC

(71) Applicant: AMPRIO GMBH, Neuss (DE)

(72) Inventors: Dietmar Greven, Dormagen (DE); Berno Johannes Engelbert Misgeld, Neuss (DE)

(73) Assignee: AMPRIO GMBH, Neuss (DE)

( * ) Notice: Subject to any disclaimer, the term of this patent is extended or adjusted under 35 U.S.C. 154(b) by 144 days.

(21) Appl. No.: 16/703,881

(22) Filed: Dec. 5, 2019

(65) Prior Publication Data

US 2020/0180729 A1 Jun. 11, 2020

(30) Foreign Application Priority Data

Dec. 6, 2018 (EP) .................................... 18210609

(51) Int. Cl.
*B62M 6/50* (2010.01)
(52) U.S. Cl.
CPC ..................................... *B62M 6/50* (2013.01)
(58) Field of Classification Search
CPC .................................. B62M 6/45; B62M 6/50
See application file for complete search history.

(56) References Cited

U.S. PATENT DOCUMENTS

| 5,860,487 A | 1/1999 | Tanaka et al. |
| 10,144,485 B2 * | 12/2018 | Stegmaier ............... B60L 15/30 |
| 2015/0019162 A1 * | 1/2015 | Hodge .................. G06F 1/1626 |
| | | 702/150 |
| 2016/0251057 A1 | 9/2016 | Stegmaier |
| 2019/0300106 A1 * | 10/2019 | Terashima ............... B62M 6/50 |
| 2019/0308512 A1 * | 10/2019 | Hasumi .................... B62M 6/45 |
| 2020/0407012 A1 * | 12/2020 | Kitano .................. B62J 45/416 |

FOREIGN PATENT DOCUMENTS

| DE | 699 31 625 T2 | 5/2007 |
| DE | 10 2012 107 195 A1 | 5/2014 |
| GB | 2485216 A | 5/2012 |
| JP | 2001-199378 A | 7/2001 |
| WO | WO 2015/014519 A1 | 2/2015 |

* cited by examiner

*Primary Examiner* — Tony H Winner
(74) *Attorney, Agent, or Firm* — Norman B. Thot

(57) ABSTRACT

A pedelec includes a drive unit with a drive motor, a battery which supplies the drive motor with power, a control unit having a motor control unit and an assist function determiner, and an operating unit informationally connected to the control unit. The motor control unit controls the power based on a reference variable and an assist function. The assist function determiner defines the power based on the reference variable and selects the assist function. The assist function determiner comprises a standard assist function memory storing a standard assist function, and a standard zone memory storing an upper and lower zone boundary of a zone criteria for applying the standard assist function. An assist function selected by the assist function determiner provides more power below the lower zone boundary and less power above the upper zone boundary. The operating unit adjusts the upper and/or lower zone boundary.

6 Claims, 3 Drawing Sheets

PEDELEC

CROSS REFERENCE TO PRIOR APPLICATIONS

Priority is claimed to European Patent Application No. EP 18210609.6, filed Dec. 6, 2018. The entire disclosure of said application is incorporated by reference herein.

FIELD

The present invention relates to a pedelec which includes an electric pedelec drive unit having a drive motor to assist driving at least one wheel of the pedelec.

BACKGROUND

The term "pedelec" as used herein refers to a bicycle which need not, however, be configured as a two-wheeler, but which is equipped with an electric drive unit which only provides assistance. The drive unit can be configured as a hub drive, a chain drive, or as a pedal spindle drive. The pedelec further comprises a rechargeable battery for supplying the drive motor with electric driving power. For electrically controlling the pedelec and in particular the pedelec drive unit, the pedelec comprises a motor control unit which controls the electric driving power for the drive motor depending on an assist function. An "assist function" as used herein means an inflexible, a liner, or a nonlinear function or mathematical operation which defines the relationship of a reference variable and the assisting motor output. In the case of pedal spindle drive motors, the assist function normally defines the electric driving power depending on the current pedaling torque applied by the rider to the pedal spindle as a reference variable.

The motor control unit in previously-described pedelecs includes a standard assist function via which the motor control unit determines a corresponding electric driving power according to the standard assist function, depending on the rider's pedaling torque, as a reference variable, and supplies said power to the drive motor. The standard assist function can be gradually and stepwise adjusted by the rider between a maximum assistance and a minimum assistance via an operating unit.

DE 10 2012 107 195 A1 describes a pedelec having a velocity control functionality via which the pedelec velocity can be kept constant. Riders generally regard inflexible velocity control functionality as inconvenient.

SUMMARY

An aspect of the present invention, to provide a pedelec having a convenient function similar to that of a velocity control.

In an embodiment, the present invention provides a pedelec which includes at least one wheel, an electric pedelec drive unit comprising a drive motor which is configured to drive the at least one wheel, a battery which is configured to supply the drive motor with an electric driving power, a pedelec control unit comprising a motor control unit and an assist function determiner which is associated with the motor control unit, and an operating unit which is informationally connected to the pedelec control unit. The motor control unit is configured to control the electric driving power for the drive motor based on a reference variable and an assist function. The assist function determiner is configured to define the electric driving power based on the reference variable and to select the assist function. The assist function determiner comprises a standard assist function memory wherein is stored a standard assist function, and a standard zone memory wherein is stored an upper zone boundary and a lower zone boundary of a zone criteria for an applicability of the standard assist function. An assist function selected by the assist function determiner results, below the lower zone boundary, in a larger electric driving power than would be provided according to the standard assist function, and above the upper zone boundary, in a smaller electric driving power than would be provided according to the standard assist function. The operating unit is configured to adjust at least one of the lower zone boundary and the upper zone boundary.

BRIEF DESCRIPTION OF THE DRAWINGS

The present invention is described in greater detail below on the basis of embodiments and of the drawings in which.

DETAILED DESCRIPTION

Figure 1:
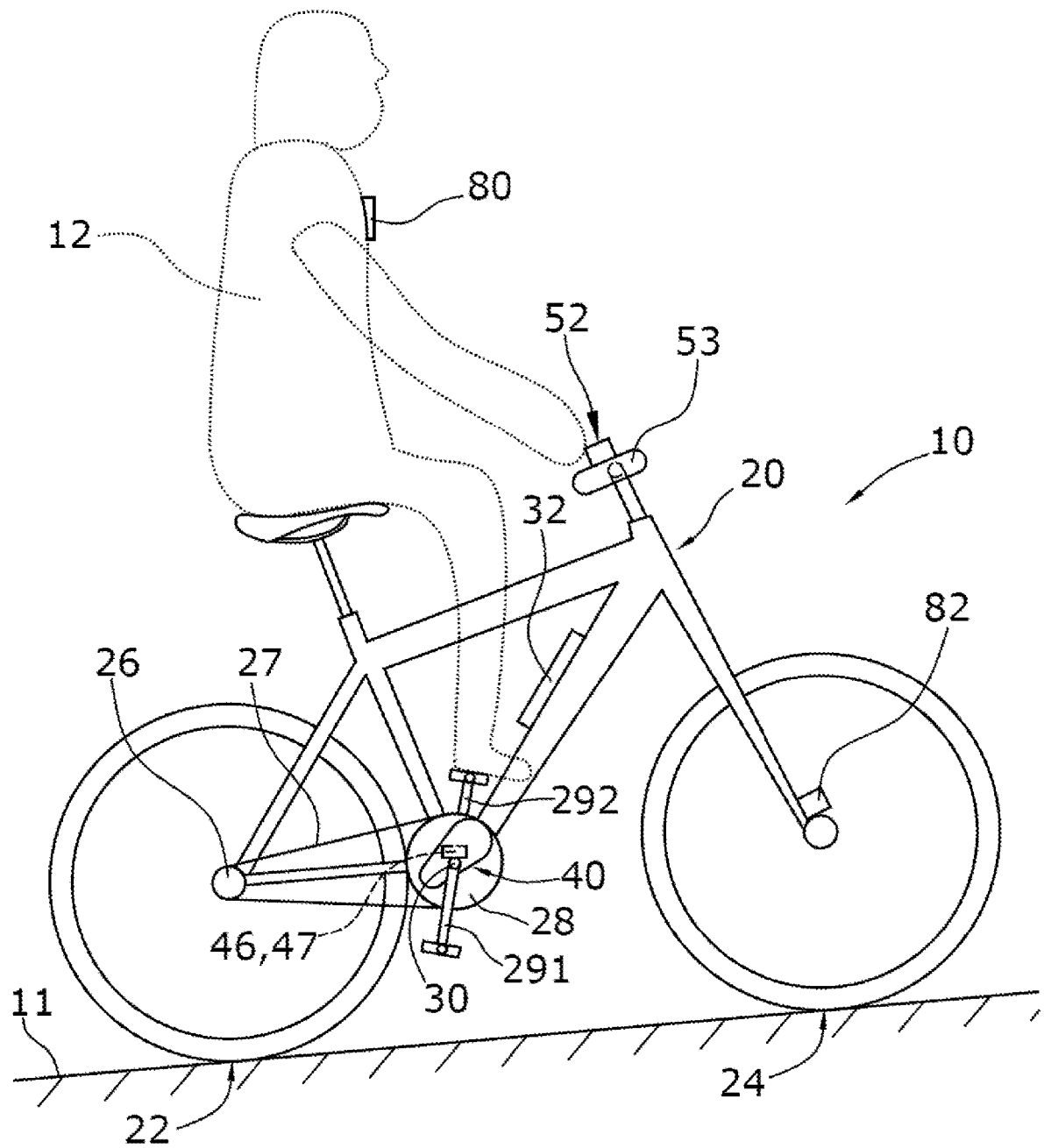
FIG. 1 shows a schematic representation of a pedelec having an operating unit and an electric pedelec drive unit for driving the rear wheel.

In an embodiment, the present invention provides a pedelec which comprises an electric pedelec drive unit having a drive motor for driving at least one wheel of the pedelec. The drive unit can, for example, be configured as a pedal spindle drive unit which drives the rear wheel of the pedelec. The pedelec further comprises a rechargeable battery for supplying the drive motor with electric driving power. The pedelec further comprises a pedelec control unit having a motor control unit which controls the electric driving power for the drive motor depending on a reference variable and on the basis of an assist function. The pedelec lastly comprises an operating unit which is informationally connected to the pedelec control unit so that the scaling or the degree of assistance of the standard assist function can be influenced, for example, via the operating unit. The assist unit can, for example, be attached to the handlebar of the pedelec.

The pedelec of the present invention comprises an assist function determiner which is associated with the motor control unit for determining the electric driving power depending on the reference variable and depending on another criteria.

According to the present invention, the additional criteria is defined by a standard zone memory in which an upper and a lower zone boundary for a zone criteria are stored. Such a defined standard zone defines whether the standard assist function stored in a standard assist function memory is or is not used. The standard zone between the two zone boundaries stored in the standard zone memory defines, in a way, a desired area for the zone criteria. The zone criteria does not, for example, correspond to the reference variable. The zone criteria can, for example, be the current pedelec velocity.

The present invention provides that, below the lower zone boundary, the assist function selected by the assist function determiner supplies a higher electrical driving power than would be the case according to the standard assist function for the respective value of the zone criteria. If the actual zone criteria, i.e., the pedelec velocity, for example, is above the upper zone boundary, the assist function determiner defines a smaller electric driving power than would be the case according to the standard assist function for the respective value of the zone criteria. When the zone criteria values are outside the two zone boundaries, efforts are thereby made to return the pedelec into the region within the two zone boundaries, for example, so that the velocity zone defined by the two zone boundaries is again reached. In the case of establishing the velocity as a zone criteria, a "smooth" velocity control is thereby realized, wherein a velocity range is established as the desired velocity.

The present invention provides that the lower zone boundary and/or the upper zone boundary are adjustable via corresponding keys of the operating unit. The two zone boundaries can, for example, be adjustable via corresponding keys of the operating unit. Both the level of the desired zone and the extent of the desired zone can thereby be individually adjusted by the rider.

In an embodiment of the present invention, the pedelec can, for example, comprise a pedaling torque sensor which determines a rider's pedaling torque, wherein the rider's pedaling toque is the reference variable for the assist regulator. The assist function selected and used by the assist function determiner thus determines the electrical driving power depending on the rider's pedaling torque as the reference variable.

In an embodiment of the present invention, the pedelec can, for example, comprise a pedelec velocity sensor which indicates the current velocity of the pedelec. The pedelec velocity sensor can, for example, be arranged at a wheel of the pedelec, but can also form part of the pedelec drive unit when the overall drive line is designed so that it provides a sufficiently exact pedelec velocity signal to the drive unit. The motor control unit can thereby be provided with exact and real-time velocity information so that the pedelec velocity can be or is the zone criteria.

In an embodiment of the present invention, the upper zone boundary can, for example, be adjustable below an inflexible and absolute upper velocity-regulating boundary. In the case of the pedelec velocity as the zone criteria, the upper zone boundary can thus be selected and adjusted below the velocity-regulating boundary. In the case of a pedelec, the upper velocity-regulating boundary is often absolutely necessary for legal reasons and can, for example, be 25, 40 or 45 km/h.

In an embodiment of the present invention, the pedelec can, for example, comprise a pedal spindle rotational frequency sensor which determines the pedaling frequency of the pedal spindle. The pedal spindle rotational frequency can be defined as the zone criteria. It is thereby possible to maintain the pedaling frequency within a desired pedaling frequency standard zone or to return the pedaling frequency to the standard zone by intervention if the pedaling frequency is outside of the adjusted standard zone. The pedaling frequency here means the number of full rotations per second of the pedal spindle holding the two pedaling cranks.

Alternatively or additionally, the present invention can, for example, provide that a heart rate detector is associated with the pedelec, which heart rate detector measures the heart rate of the pedelec rider. The heart rate detector is informationally connected to the assist function determiner so that the heart rate can also be defined as a zone criteria. A standard zone can thereby be defined for the heart rate and its inverse value, respectively, wherein, when the upper zone boundary is exceeded, the assist function provides that a larger assistance is provided by the drive motor, but when said boundary is not reached, the drive motor provides less assistance.

An exemplary embodiment of the present invention will be explained in detail below on the basis of the drawings.

FIG. 1 schematically illustrates a pedelec 10 which is ridden by a rider 12. The pedelec 10 comprises a pedelec frame 20 which carries a rear wheel 22 and a front wheel 24. The rear wheel 22 and the front wheel 24 each rest on a foot supporting surface 11. A handlebar 53, via which the front wheel 24 can be steered, has fastened thereto an operating unit 52 which is illustrated in detail in FIG. 2.

The pedelec frame 20 comprises a bottom-bracket drive unit 40 on which a pedal spindle 30 is seated which comprises, at its two longitudinal ends, a respective pedaling crank 291, 292 at whose free ends a respective pedal is rotatably mounted. The drive unit 40 comprises a driven gear 28 which transmits the mechanical driving power to a rear wheel bottom sprocket 26 via a drive chain 27. The pedelec frame 20 further carries a rechargeable battery 32 which supplies the drive unit 40, the drive motor 42 within the drive unit 40, as well as the operating unit 52 with electric power.

The drive unit 40 comprises an essentially closed drive unit housing 41 where the pedal spindle 30 is rotatably seated, the drive motor 42 driving the pedal spindle 30 is arranged, and a power electronic system 44 is arranged via which the electric driving power E for the drive motor 42 is provided depending on corresponding control signals. The drive unit 40 comprises a pedal spindle rotational frequency sensor 46 which determines the pedaling rate fspindle and the rotational frequency, respectively, of the pedal spindle 30 and which comprises a pedaling torque sensor 47 which determines the rider's 12 pedaling torque M introduced by the rider 12 into the pedal spindle 30.

A pedelec velocity sensor 82 is arranged at the front wheel 24 which determines the current pedelec velocity V and transmits it, for example, in a wireless manner.

A heart rate detector 80 which is worn by the rider 12 is also provided. The heart rate detector detects and transmits the heart rate of the pedelec rider 12 in a wireless manner. The heart rate detector 80 can, however, also be provided, for example, at the pedelec in the form of corresponding sensors in the grips of the handlebar 53.

Figure 2:
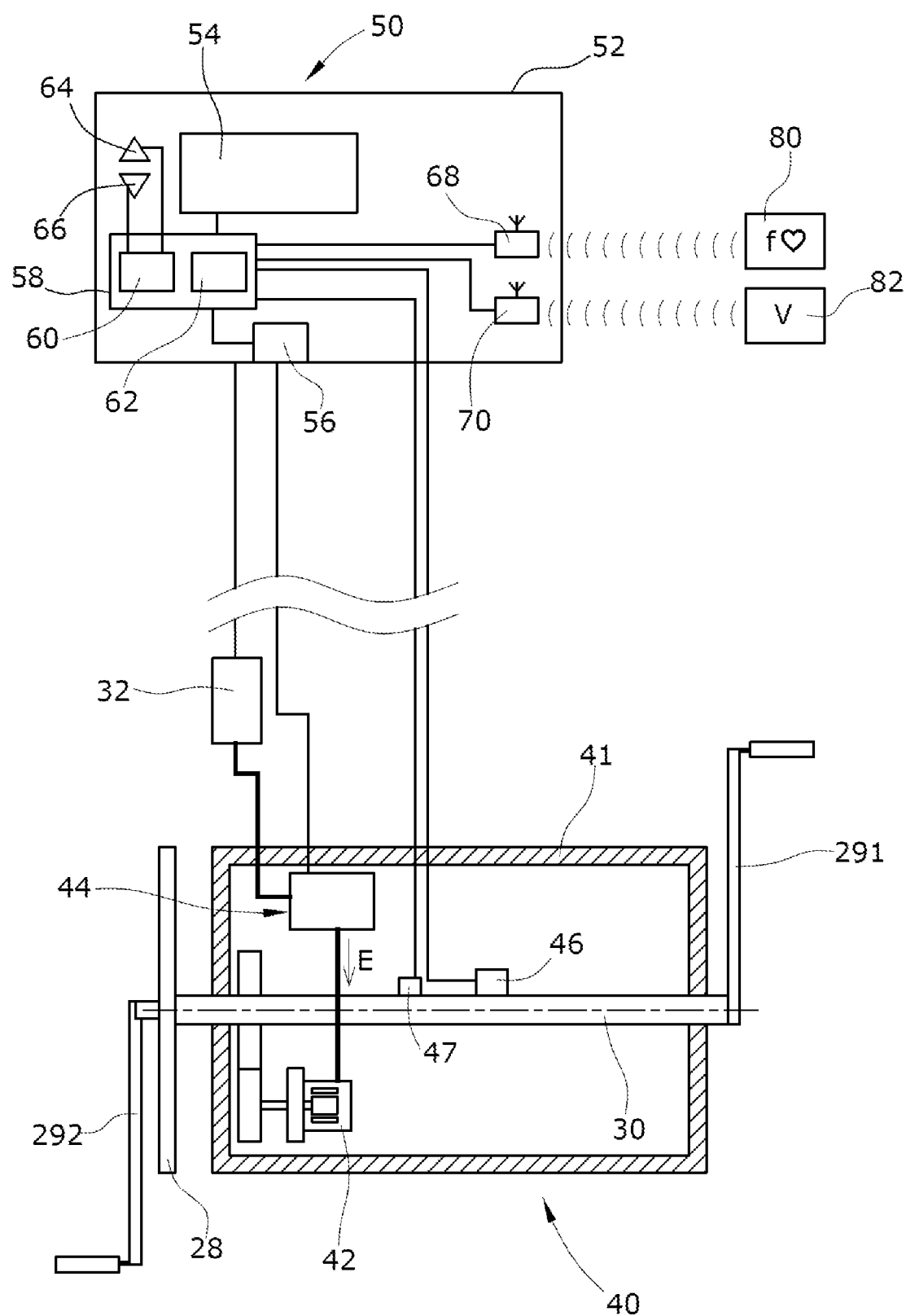
FIG. 2 shows a detailed schematic representation of the operating unit and the drive unit of FIG. 1 comprising a motor control unit and an assist function determiner.

FIG. 2 schematically illustrates the operating unit 52 which comprises a complex pedelec control unit 50. The pedelec control 50 unit comprises a motor control unit 56 whose output signals directly control the power electronic system 44 of the drive motor 42. The pedelec control unit 50 further comprises two keys 64, 66 and an assist function determiner 58 which, in turn, comprises a standard assist function memory 60 and a standard zone memory 62. In the standard assist function memory 60, a standard assist function US is stored according to which the electric driving power E is determined depending on a reference variable. In the present exemplary embodiment, the reference variable is the pedelec velocity V which is sent in a wireless manner by the pedelec velocity sensor 82 to a velocity signal receiver 70 that also forms part of the pedelec control unit 50. The pedelec control unit 50 further comprises a heart rate receiver 68 which receives the heart rate signal of the heart rate detector 80 in a wireless manner. The operating unit 52 further comprises a display 54 for visualization of measured values and adjusted or selected functions.

Figure 3:
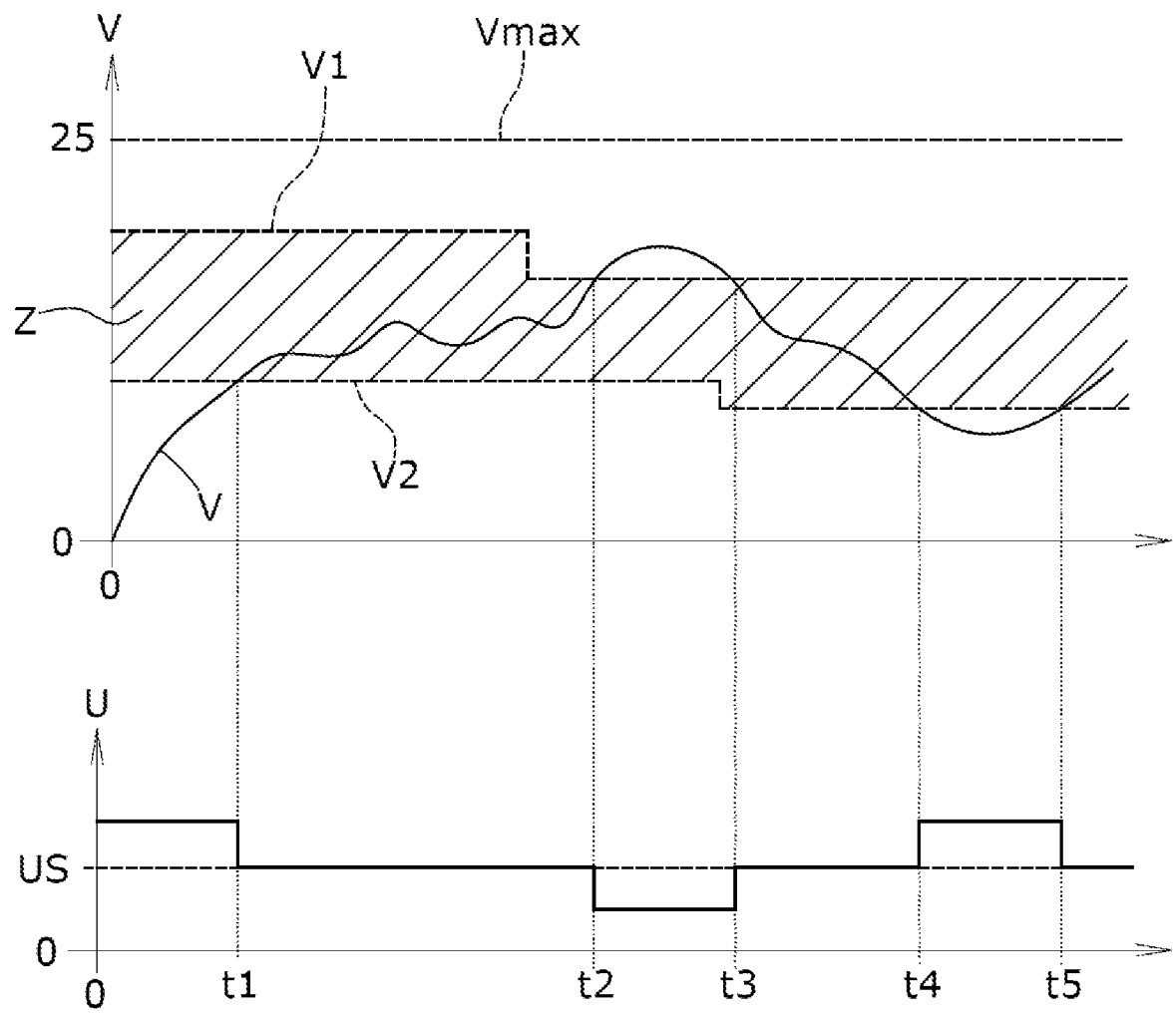
FIG. 3 shows a graphical representation of the relationship between the pedelec velocity and the assist function stored in the assist function determiner.

FIG. 3 graphically shows the correlation between the pedelec velocity V as the reference variable, a pedelec velocity standard zone Z, and the assist function U.

A standard zone function can be switched on and off via the operating unit 52, and the zone criteria can be selected among the pedelec velocity V, the heart rate rheart and the pedaling rate fspindle. When the standard zone function is switched on and the pedelec velocity V is selected as the zone criteria, the pedelec control unit 50 operates as follows.

In the standard assist function memory 60, a standard assist function US is stored which is generally operative across the overall possible assisted velocity range between 0 km/h and Vmax of 25 km/h, for example, when the standard zone function is switched off. The degree of assistance of the standard assist function US can be adjusted and selected in several steps via the keys 64, 66. The standard assist function US determines M as the reference variable, depending on the rider's pedaling torque, on the basis of a function or a table of the electric driving power E which is applied to the drive motor 42 by the power electronic system 44.

When the standard zone function is switched on, the level of the upper zone boundary V1 and the lower zone boundary V2 defining the pedelec velocity standard zone Z can be adjusted via the keys 64, 66.

As long as the pedelec velocity V is within the pedelec velocity standard zone Z, the electric drive power E is defined on the basis of the standard assist function US. If the zone criteria, i.e., the pedelec velocity in the present exemplary embodiment, is below the lower zone boundary V2, the assist function determiner 58 determines and outputs a higher electric driving power E than would be provided for this pedelec velocity V according to the standard assist function US. This situation is illustrated in FIG. 3 in the time intervals 0 to t1 and t4 to t5. In these two time intervals, the assist function U is thus increased as compared with the assist function US in the intervals t1 to t2 and t3 to t4 where the pedelec velocity V is within the standard zone Z.

In the time interval t2 to t3, the pedelec velocity V exceeds the upper zone boundary V1 so that the assist function determiner 58 selects an assist function U which results in a lower electric driving power E than would be provided according to the standard assist function US.

The rider 12 thus receives assistance for keeping the pedelec velocity V within the standard zone Z, but this is not forced. A comfortable and conveniently fuzzy quasi-velocity-control function for the pedelec 10 is thereby provided.

Alternatively to the pedelec velocity V as a zone criteria, the heart rate fheart or the pedaling frequency fspindle can be selected as the zone criteria.

The present invention is not limited to embodiments described herein; reference should be had to the appended claims.

What is claimed is:

1. A pedelec comprising:
   at least one wheel;
   an electric pedelec drive unit comprising a drive motor which is configured to drive the at least one wheel;
   a battery which is configured to supply the drive motor with an electric driving power;
   a pedelec control unit comprising a motor control unit and an assist function determiner which is associated with the motor control unit, the motor control unit being configured to control the electric driving power for the drive motor based on a reference variable and an assist function, the assist function determiner being configured to define the electric driving power based on the reference variable and to select the assist function; and
   an operating unit which is informationally connected to the pedelec control unit,
   wherein,
   the assist function determiner comprises,
     an assist function which is stored in an assist function memory, and
     an upper zone boundary and a lower zone boundary of a zone criteria for an applicability of the assist function, the upper zone boundary and the lower zone boundary of the zone criteria being stored in a zone memory,
   an assist action selected by the assist function determiner results,
     below the lower zone boundary, in a larger electric driving power than would be provided according to the assist function, and
     above the upper zone boundary, in a smaller electric driving power than would be provided according to the assist function, and
   the operating unit is configured to adjust at least one of the lower zone boundary and the upper zone boundary.

2. The pedelec as recited in claim 1, further comprising:
   a pedelec velocity sensor which is configured to determine a current velocity of the pedelec and whether the current pedelec velocity is the zone criteria.

3. The pedelec as recited in claim 2, wherein the upper zone boundary is adjustable above an inflexible and absolute speed-regulating boundary.

4. The pedelec as recited in claim 1, further comprising:
   a pedal spindle; and
   a pedal spindle rotational frequency sensor which is configured to determine a pedaling frequency of the pedal spindle,
   wherein,
   a pedal spindle rotational frequency is the zone criteria.

5. The pedelec as recited in claim 1, further comprising:
   a heart rate detector which is configured to determine a heart rate of a rider,
   wherein,
   the heart rate is the zone criteria.

6. The pedelec as recited in claim 1, further comprising:
   a pedaling torque sensor which is configured to determine a pedaling torque,
   wherein,
   the pedaling torque is the reference variable.

* * * * *